US011687530B2

(12) United States Patent
Krishna et al.

(10) Patent No.: US 11,687,530 B2
(45) Date of Patent: Jun. 27, 2023

(54) SHARDED STORAGE OF GEOLOCATED DATA WITH PREDICTABLE QUERY RESPONSE TIMES

(71) Applicant: Niantic, Inc., San Francisco, CA (US)

(72) Inventors: Dharini Krishna, Santa Clara, CA (US); Peter James Turner, Redwood City, CA (US); Gandeevan Raghuraman, Santa Clara, CA (US); Benjamin Peake, Sunnyvale, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 17/127,408

(22) Filed: Dec. 18, 2020

(65) Prior Publication Data

US 2021/0191940 A1  Jun. 24, 2021

Related U.S. Application Data

(60) Provisional application No. 62/952,140, filed on Dec. 20, 2019.

(51) Int. Cl.
*G06F 16/00* (2019.01)
*G06F 16/2453* (2019.01)
(Continued)

(52) U.S. Cl.
CPC ...... *G06F 16/24532* (2019.01); *A63F 13/216* (2014.09); *G06F 16/24545* (2019.01); *G06F 16/29* (2019.01)

(58) Field of Classification Search
CPC ......... G06F 16/24532; G06F 16/24545; G06F 16/27; G06F 16/29; A63F 13/216; A63F 13/213; A63F 13/35; A63F 13/65
See application file for complete search history.

(56) References Cited

U.S. PATENT DOCUMENTS

| 8,447,757 B1* | 5/2013 | Cox | G06F 9/5061 |
| | | | 707/720 |
| 9,128,789 B1* | 9/2015 | Zorzella | G06F 9/547 |
| (Continued) | | | |

FOREIGN PATENT DOCUMENTS

| CN | 106178506 A | 12/2016 |
| EP | 3122019 A1 | 1/2017 |
| (Continued) | | |

OTHER PUBLICATIONS

PCT International Search Report and Written Opinion, PCT Application No. PCT/IB2020/062239, dated Mar. 29, 2021, ten pages.
(Continued)

*Primary Examiner* — Dinku W Gebresenbet
(74) *Attorney, Agent, or Firm* — Fenwick & West LLP

(57) ABSTRACT

A system enables an arbitrary number of items to be indexed in a geographic region that provides a predictable query response time across a sharded database. Items indexed to the geographic region are stored on a single shard and additional items are added to that shard as long as an overflow condition indicative of undesirable query response times is not met. If the overflow condition is met the system expands the storage of items indexed to the geographic region to one or more additional shards in order to maintain predictable query response times. The system may maintain a shard count representing the total number of shards being used to store items corresponding to a geographic region, which can be used to query one or more relevant shards. The system may apply deterministic hashing in order to evenly distribute shards across database nodes of the sharded database.

19 Claims, 6 Drawing Sheets

(51) Int. Cl.
*A63F 13/216* (2014.01)
*G06F 16/29* (2019.01)

(56)  References Cited

U.S. PATENT DOCUMENTS

| | | | |
|---|---|---|---|
| 9,875,272 | B1 | 1/2018 | Jhingran et al. |
| 2011/0276692 | A1 | 11/2011 | Waldman et al. |
| 2012/0054217 | A1* | 3/2012 | Clarke .................. G06F 16/954 |
| | | | 707/769 |
| 2013/0073581 | A1* | 3/2013 | Sandholm ........... G06F 16/9537 |
| | | | 707/769 |
| 2015/0201298 | A1 | 7/2015 | Zhang et al. |
| 2017/0366624 | A1* | 12/2017 | Tsang .................... G06F 16/278 |
| 2018/0300385 | A1 | 10/2018 | Merriman et al. |
| 2019/0121902 | A1* | 4/2019 | Ryan ..................... G06F 16/212 |

FOREIGN PATENT DOCUMENTS

| | | |
|---|---|---|
| TW | 201250613 A | 12/2012 |
| WO | WO 2013/180355 A1 | 12/2013 |
| WO | WO 2015/192117 A1 | 12/2015 |
| WO | WO 2017/058705 A1 | 4/2017 |

OTHER PUBLICATIONS

Taiwan Intellectual Property Administration, Office Action, TW Patent Application No. 109145171, dated Nov. 30, 2021, 15 pages.
European Patent Office, Extended European Search Report and Opinion, EP Patent Application No. 20903083.2, dated May 12, 2023, nine pages.

* cited by examiner

SHARDED STORAGE OF GEOLOCATED DATA WITH PREDICTABLE QUERY RESPONSE TIMES

CROSS REFERENCE TO RELATED APPLICATIONS

This application claims the benefit of U.S. Provisional Application No. 62/952,140, filed Dec. 20, 2019, which is incorporated by reference in its entirety.

FIELD OF THE INVENTION

The present disclosure relates generally to data storage, and, in particular, to sharded storage of arbitrary numbers of geolocated items with predictable query response times.

BACKGROUND

A parallel reality game providing a shared virtual world that parallels at least a portion of the real world may host a variety of interactions that can attract a community of players. Providing a virtual world with a geography that parallels at least a portion of the real world allows players to navigate the virtual world by navigating the real world. Linking virtual elements in the virtual environment with real world objects, locations, and actions in the real world can encourage players to travel to and notice features in the real world that the players would normally ignore. Providing virtual elements in the same location in the virtual world as their counterpart real world objects or locations in the real world increases the impression that the virtual elements are hidden parts of the real world.

When playing the parallel reality game, a player's client device typically receives data corresponding to virtual elements in the vicinity of the player. As the density of virtual elements and richness of information available increases, the amount of data in the game database increases. Using conventional database storage, this results in an increase in query response time. However, as parallel reality games may be designed for real time interaction between the player and the virtual world, there is an upper limit on acceptable response times. Therefore, there is a need for efficient storage approaches that provide predictable query response times as the amount of data stored for a geographic region increases.

SUMMARY

The above and other problems may be addressed by a system and method for enabling an arbitrary number of items to be indexed in a geographic region (e.g., using a geographic indexing framework, such as the S2 library) that provides a predictable query response time across a sharded database. In various embodiments, items indexed to the geographic region are stored on a single shard and additional items are added to that shard as long as an overflow condition indicative of undesirable query response times is not met (e.g., query response time remain under a desired threshold). If the overflow condition is met the system expands the storage of items indexed to the geographic region to one or more shards in order to maintain predictable query response times. The system may maintain a shard count representing the total number of shards being used to store items corresponding to a geographic region, which can be used to query one or more relevant shards (e.g., in parallel). The system may apply deterministic hashing in order to evenly distribute shards across database nodes of the sharded database, such as virtual or physical database servers). A client of the database may determine which database nodes each shard corresponding to the geographic region is stored on based on the shard count, rather than storing a list of every database node on which items for the geographic region are stored. This enables storage of many items for large geographical areas while providing predictable response times, for example, when querying a single shard or multiple shards in parallel.

In one embodiment, the system receives a request indicating a geolocation. Based on the geolocation, the system identifies a geographic region. Based on the geographic region, the system identifies a database shard of a plurality of database shards of a database, the plurality of database shards corresponding to the geographic region. The system queries the identified database shard for geolocated data corresponding to the geographic region, the query of the database shard having a predictable response time. Based on the queried geolocated data, the system processes query results. The system returns the query results in response to the request.

DETAILED DESCRIPTION

Figure 1:
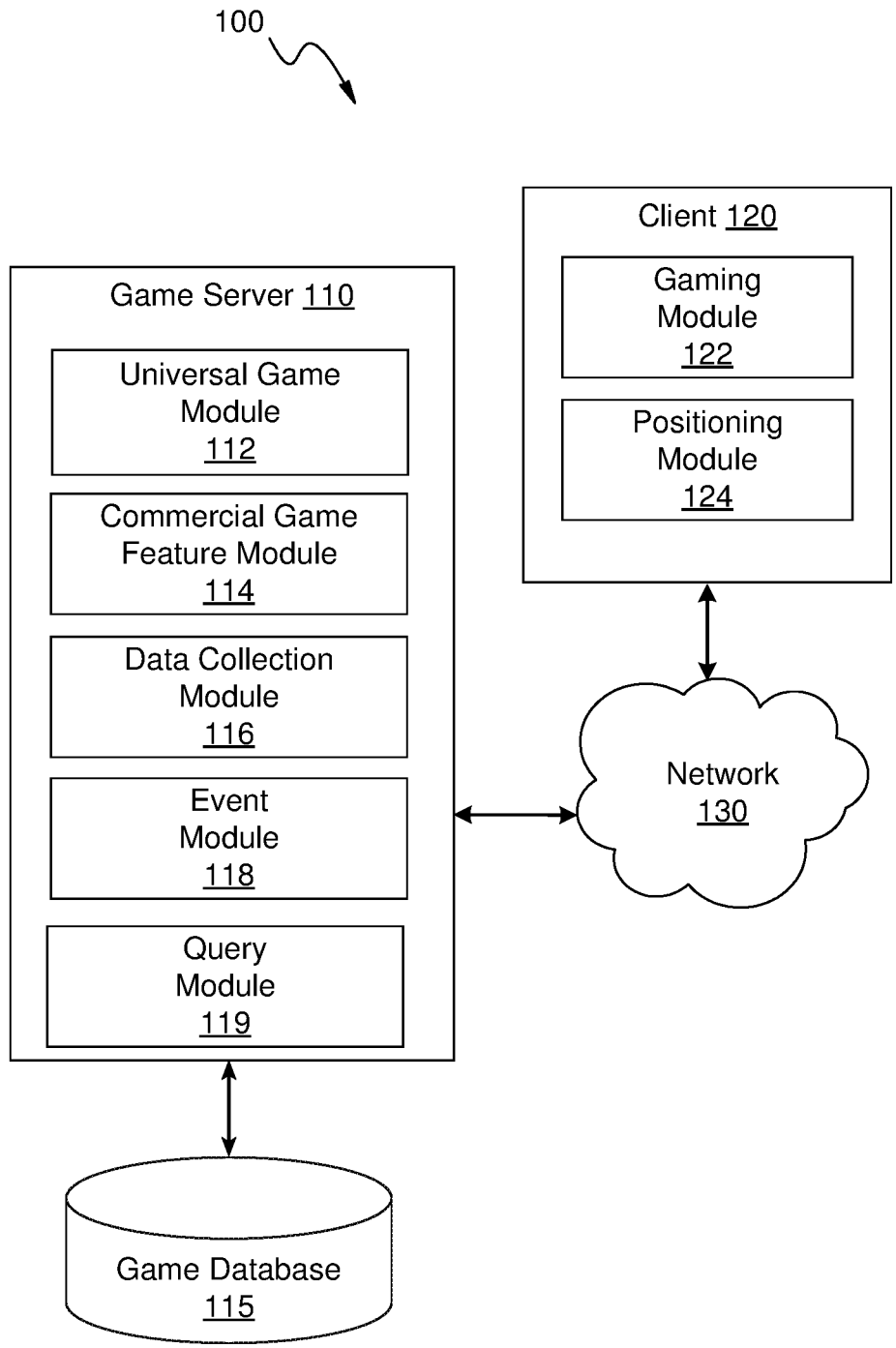
FIG. 1 is a block diagram of a networked computing environment in which game data for an arbitrary number of geolocated items may be stored with predictable query response times, according to one embodiment.

A game server can host a parallel reality game having a player gaming area that includes a virtual world with a geography that parallels at least a portion of the real-world geography. Players can navigate a range of coordinates defining a virtual space in the virtual world by navigating a range of geographic coordinates in the real world. In particular, the positions of players can be monitored or tracked using, for instance, a positioning system (e.g., a GPS system) associated with a player's client device which may be a mobile computing device. Player position information can be provided to the game server hosting the parallel reality game over a network and can be used by the game to update player locations in the virtual world. As a result, as the player continuously moves about in a range of coordinates in the real world with their client device, the game server may update such that the player also continuously moves about in a range of coordinates in the parallel virtual world.

The virtual world can include one or more virtual elements that are linked with real-world points of interest. For instance, the virtual world can include various virtual elements associated with points of interest such as landmarks, museums, works of art, libraries, or other areas of interest in the real world. The virtual elements linked with real-world points of interest can provide the illusion that the virtual world is a hidden dimension of the real world that a player can interact with by playing the parallel reality game. For instance, as players navigate geographic coordinates in the real world, the players can discover and interact with virtual elements provided in the parallel virtual world. Various game objectives can encourage players to interact with these virtual elements as part of the parallel reality game. In some embodiments, the game server may orchestrate virtual events in the parallel reality game around real-world points of interest.

The virtual world may be divided up into portions (e.g., cells) corresponding to contiguous geographic regions of the real world. In various embodiments, the portions of the virtual world are defined according to a geographic indexing framework. For instance, the portions of the virtual world may be defined according to the S2 library, which defines a hierarchy of cells dividing the globe, a three-dimensional object, into sets of two-dimensional cells at different levels of granularity. In other cases, different geographic indexing frameworks may be used. The portions of the virtual world can be used to index various geolocated data associated with a corresponding geographic region for storage, such as information associated with the virtual elements described above. Over time, new virtual elements may be added to the virtual world and the amount of data associated with virtual elements may increase. For example, virtual elements may correspond to points of interest in the real world and new virtual elements may be added as the system learns of new points of interest (e.g., due to submissions by owners or managers of the points of interest, through crowdsourcing, or using any other suitable technique). Similarly, as new information associated with virtual elements is obtained (e.g., new photographs, videos, historical information, etc.) it may be stored in conjunction with the virtual elements. Thus, the amount of data corresponding to a portion of the virtual world may increase over time.

Using conventional approaches, as the amount of data increases, the query response time for identifying that data also increases. However, to provide consistent performance of the parallel-reality game, it is desirable to provide predictable query response times, regardless of the amount of data that is stored for any given portion of the virtual world. As is described in greater detail below, various embodiments provide predictable query response times by limiting the amount of data stored in any given shard according to an overflow condition indicative of undesirable query response times. A shard count value for each portion may be stored that can be used to identify the shard or shards containing data for the given portion of the virtual world. A deterministic hashing approach is used to identify the shard or shards containing data for a given portion of the virtual world and the shards are queried for relevant data (e.g., in parallel). Thus, the query response time is predictable, regardless of the amount of data stored for the given portion of the virtual world, because the amount of data in any one of the shards does not exceed a threshold.

Although the described embodiments relate to accessing geolocated data for a parallel reality game, one of skill in the art will recognize that the same or similar techniques may be used with geolocated data for other purposes. For example, a tourist guide application with geolocated information about local sights, restaurants, museums, and other landmarks may be sharded in a similar manner to provide predictable query response times.

Exemplary Location-Based Parallel Reality Gaming System

A parallel reality game is a location-based game having a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where verifying the location of a user is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

FIG. 1 illustrates one embodiment of a networked computing environment 100 in which a player's real-world location may be verified based on activity within a parallel reality game. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 120.

Figure 2:
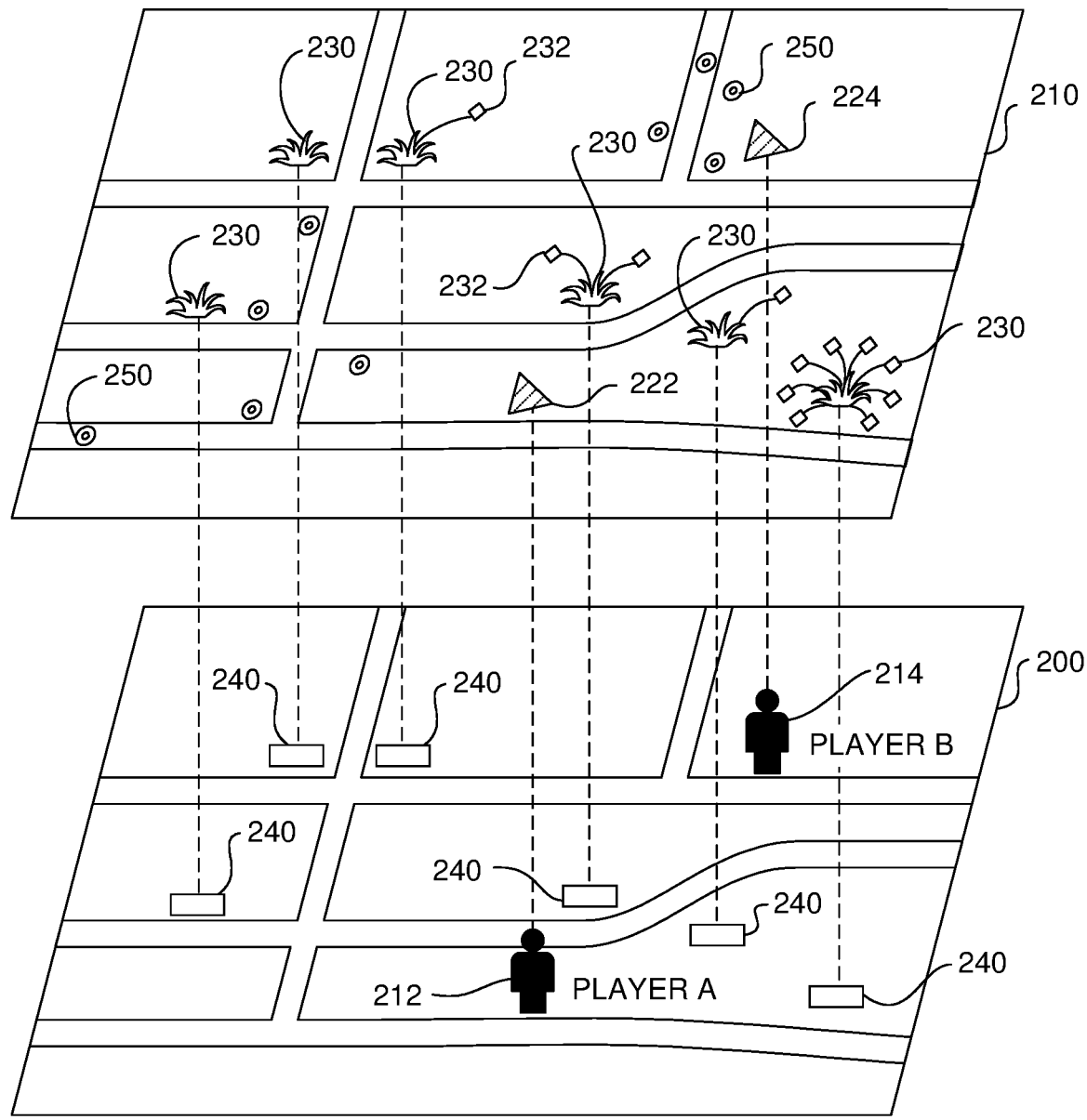
FIG. 2 depicts a representation of a virtual world having a geography that parallels the real world, according to one embodiment.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective can require players to capture or claim ownership of virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230. In some embodiments, the interaction with the virtual element 230 may further prompt verification of the player's location in the real world 200 matching the player's location in the virtual world 210.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real-world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward that can be used throughout the game (e.g., to purchase in-game items). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Figure 3:
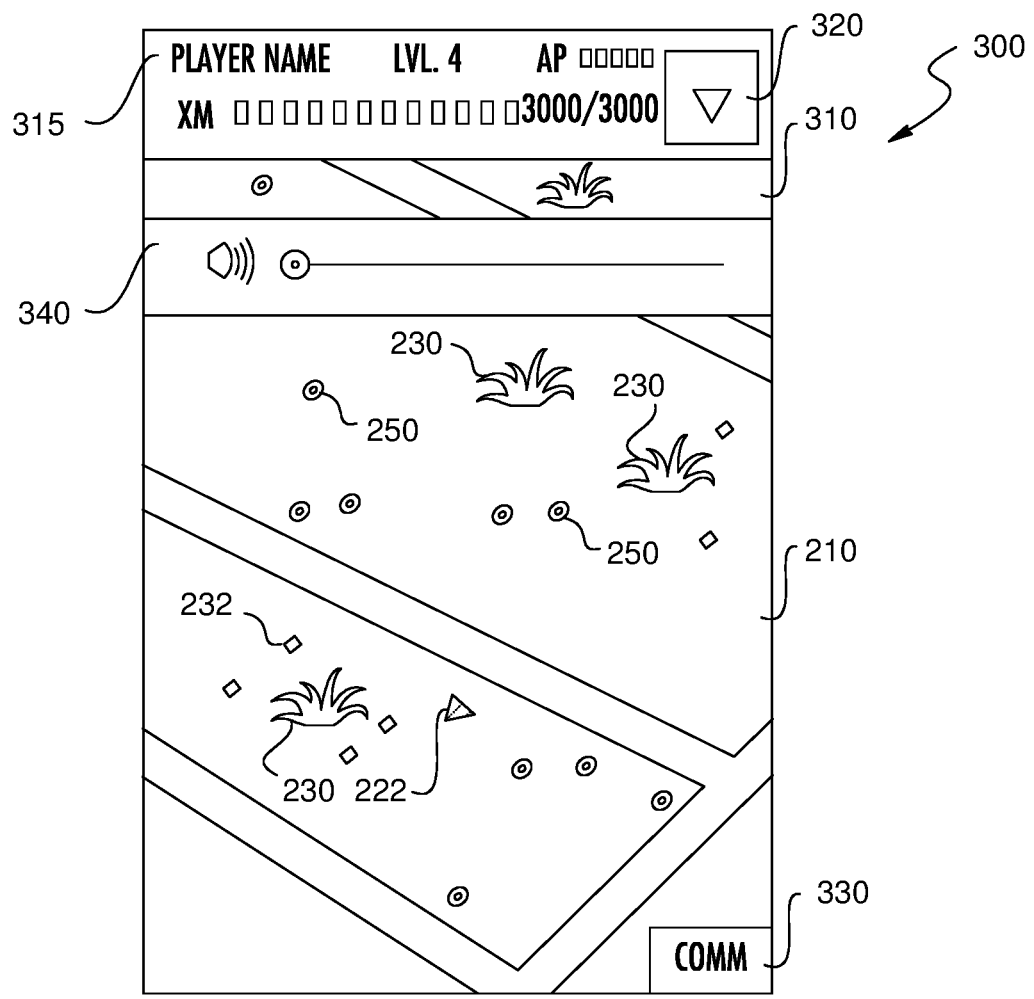
FIG. 3 depicts an exemplary game interface of a parallel reality game, according to one embodiment.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Referring back FIG. 1, a client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system, wearable computing device, a display having one or more processors, or other such device. In short, a client 120 can be any computer device or system that can enable a player to interact with the game system 100.

The client 120 can include one or more processors and one or more computer-readable media. The computer-readable media can store instructions which cause the processor to perform operations. The client 120 can include various input/output devices for providing and receiving information from a player, such as a display screen, touch screen, touch pad, data entry keys, speakers, cameras, and/or a microphone suitable for voice recognition. The client 120 may also include other various sensors for recording data from the client 120 including but not limited to movement sensors, accelerometers, gyroscopes, other inertial measurement units (IMUs), barometers, positioning systems, thermometers, light sensors, etc. The client 120 can further include a network interface for providing communications over the network 130. A network interface can include any suitable components for interfacing with one more networks, including for example, transmitters, receivers, ports, controllers, antennas, or other suitable components.

Because the networked computing environment 100 provides a location-based game, the client 120 is preferably a portable computing device that can be easily carried or otherwise transported with a player, such as a smartphone or tablet. In the embodiment shown in FIG. 1, each client 120 includes software components such as a gaming module 122 and a positioning module 124. In other embodiments, the clients 120 may include different or additional elements such as a display (as a component of the client 120 or external to the client 120), various input devices (e.g., a touchscreen, a mouse, a stylus, etc.).

The gaming module 122 provides a player with an interface to participate in the parallel reality game. The game server 110 transmits game data over the network 130 to the client 120 for use by the gaming module 122 at the client 120 to provide local versions of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

The gaming module 122 executed by the client 120 provides an interface between a player and the parallel reality game. The gaming module 122 can present a user interface on a display device associated with the client 120 that displays a virtual world (e.g. renders imagery of the virtual world) associated with the game and allows a user to interact in the virtual world to perform various game objectives. The gaming module 122 can also control various other outputs to allow a player to interact with the game without requiring the player to view a display screen. For instance, the gaming module 122 can control various audio, vibratory, or other notifications that allow the player to play the game without looking at the display screen. The gaming module 122 can access game data received from the game server 110 to provide an accurate representation of the game to the user. The gaming module 122 can receive and process player input and provide updates to the game server 110 over the network 130.

The positioning module 124 can be any device or circuitry for monitoring the position of the client 120. For example, the positioning module 124 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 124 may further include various other sensors that may aid in accurately positioning the client 120 location.

As the player moves around with the client 120 in the real world, the positioning module 124 tracks the position of the player and provides the player position information to the gaming module 122. The gaming module 122 updates the player position in the virtual world associated with the game based on the actual position of the player in the real world. Thus, a player can interact with the virtual world simply by carrying or transporting the client 120 in the real world. In particular, the location of the player in the virtual world can correspond to the location of the player in the real world. The gaming module 122 can provide player position information to the game server 110 over the network 130 such that the universal gaming module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The networked computing environment 100 uses a client-server architecture, where a game server 110 communicates with one or more clients 120 over a network 130 to provide a parallel reality game to players at the clients 120. The networked computing environment 100 also may include other external systems such as sponsor/advertiser systems or business systems. Although only one client 120 is illustrated in FIG. 1, any number of clients 120 or other external systems may be connected to the game server 110 over the network 130. Furthermore, the networked computing environment 100 may contain different or additional elements and functionality may be distributed between the clients 120 and the server 110 in a different manner than described below.

The game server 110 can be any computing device and can include one or more processors and one or more computer-readable media. The computer-readable media can store instructions which cause the processor to perform operations. The game server 110 can include or can be in communication with a game database 115. The game database 115 stores game data used in the parallel reality game to be served or provided to the client(s) 120 over the network 130.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from one or more clients 120 over the network 130.

The game server 110 can be configured to receive requests for game data from one or more clients 120 (for instance via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client 120 can be configured to periodically send player input and other updates to the game server 110, which the game server 110 uses to update game data in the game database 115 to reflect any and all changed conditions for the game.

In the embodiment shown, the server 110 includes a universal gaming module 112, a commercial game feature module 114, a data collection module 116, an event module 118, and a query module 119. The game server 110 accesses game data form a remote, distributed game database 115.

Figure 4:
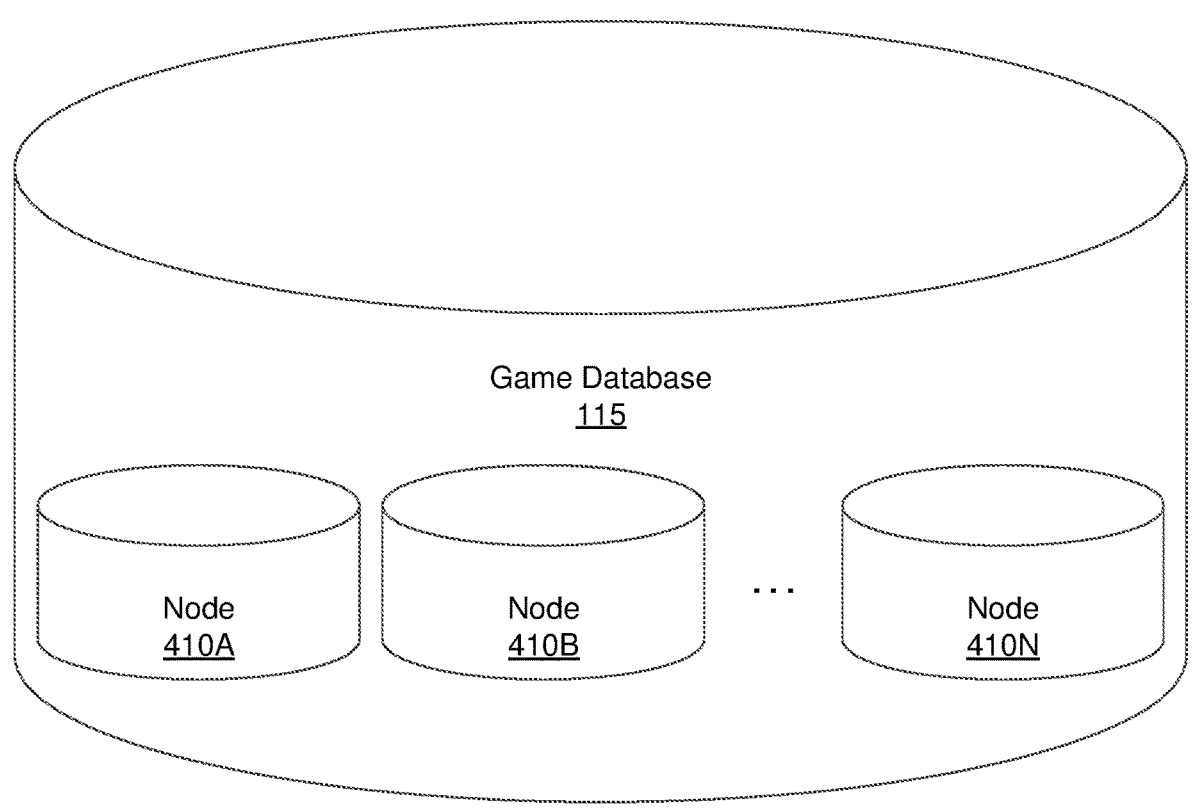
FIG. 4 is a block diagram of the game database shown in FIG. 1, according to one embodiment.

Various embodiments of the query module 119 and game database 115 are described in greater detail below, with reference to FIG. 4. In other embodiments, the game server 110 contains different and/or additional elements. In addition, the functions may be distributed among the elements in a different manner than described. For instance, the game database 115 can be integrated into the game server 110.

The universal game module 112 hosts the parallel reality game for all players and acts as the authoritative source for the current status of the parallel reality game for all players. The universal game module 112 receives game data from clients 120 (e.g. player input, player position, player actions, landmark information, etc.) and incorporates the game data received into the overall parallel reality game for all players of the parallel reality game. The universal game module 112 can also manage the delivery of game data to the clients 120 over the network 130. The universal game module 112 may also govern security aspects of clients 120 including but not limited to securing connections between the clients 120 and the game server 110, establishing connections between various clients 120, and verifying the location of the various clients 120.

The commercial game feature module 114, in embodiments where one is included, can be separate from or a part of the universal game module 112. The commercial game feature module 114 can manage the inclusion of various game features within the parallel reality game that are linked with a commercial activity in the real world. For instance, the commercial game feature module 114 can receive requests from external systems such as sponsors/advertisers, businesses, or other entities over the network 130 (via a network interface) to include game features linked with commercial activity in the parallel reality game. The commercial game feature module 114 can then arrange for the inclusion of these game features in the parallel reality game.

The game server 110 can further include a data collection module 116. The data collection module 116, in embodiments where one is included, can be separate from or a part of the universal game module 112. The data collection module 116 can manage the inclusion of various game features within the parallel reality game that are linked with a data collection activity in the real world. For instance, the data collection module 116 can modify game data stored in the game database 115 to include game features linked with data collection activity in the parallel reality game. The data collection module 116 can also analyze and data collected by players pursuant to the data collection activity and provide the data for access by various platforms.

The event module 118 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The query module 119 constructs and executes queries on the game database 115 and provides the results to other components of the networked computing environment 100 (e.g., to the gaming module 122 of a client device 120 for use in a parallel reality game). FIG. 4 illustrates one embodiment of the game database 115. In the embodiment shown, the game database 115 includes N nodes 410A-N. Each node 410 may be a different physical machine or a different virtual machine. Thus, the nodes 410 may be queried independently. As geolocated data for a shard corresponding to a cell representing a geographic region is added to a node 410, the query module 119 monitors the node for an overflow condition indicative of a response time for queries of data stored on the node, and by extension queries of the shard, being undesirable. The overflow condition can be a limit on the amount of data stored on the node, the number of items stored on the node, the query response time of queries on the node, or any other suitable parameter indicative of the amount of data stored on the node and, thus, the expected query response time. If the overflow condition is met, the query module 119 increments the shard count for the cell and starts a new shard for the cell on a different node 410. Thus, as the amount of data for a given cell increases, the number of nodes 410 on which geolocated data corresponding to the cell is stored dynamically increases, while the amount of data on any one node is restricted such that the query response time remains predictable. In some embodiments, the query module 119 sets a flag associated with the shard on the node (e.g., a stored parameter) indicating that the shards associated with the cell have expanded to another node. For example, the query module 119 may check whether flags for one or more shared associated with to a cell are set when storing new data for the cell. In this case, if the query module 119 determines that the flag for a particular shard is set, it may attempt to store the data on another shard, until the query module 119 identifies a shard where the flag is not set or a new shard is generated for the cell.

Referring back to FIG. 1, the query module 119 generates queries for geolocated data responsive to requests received from client devices 120 based on a location of the client devices 120. The queries may retrieve, update, or otherwise manipulate the geolocated data. The query module 119 further provides a query response to the client devices 120 based on processing of the queried geolocated data, such as query responses including requested geolocated data. In one embodiment, the query module 119 receives a location from a client 120 (e.g., a GPS location generated by the positioning module 124) and identifies one or more portions of the virtual world of interest based on the location, such as by querying a geographic cell index for cells representing portions of the virtual world corresponding to geographic regions including the location. For example, in the case where S2 cells are used, the query module may identify the S2 cell of a specified level (e.g., level 12) in which the client 120 is located, any S2 cell of a specified level (e.g., level 16) that at least a part of is within a specified radius (e.g., two kilometers) of the location, any S2 cell of a specified level that is completely within a specified radius, or any other suitable set of S2 cells (e.g., within an ellipse accounting for the client's current direction of travel).

Each S2 cell has a cell ID. The query module 119 also stores a shard number indicating the number of shards that include data for the cell. The query module 119 uses the cell ID and shard number to generate a unique key for each shard that includes data for the cell. The unique key or keys may be generated by combining the cell ID with each integer value from zero to the shard number. For example, for a cell ID of 7686 and shard number of 3, three keys may be generated as 7686-0, 7686-1, and 7686-2. Any suitable combination method that generates unique keys may be used, such as concatenation.

The query module 119 determines which node of the distributed database 115 each shard with relevant data is located based on the unique keys. In some embodiments, the query module 119 applies a deterministic hashing technique to convert a unique key into a slot number. For instance, the database 115 may have a maximum number of slots (e.g., 16565) and the query module 119 may apply a modular hashing technique to the unique keys using the maximum number of slots to generate slot numbers (e.g., unique key modulo maximum slot number). In other embodiments, other deterministic hashing techniques may be used to convert the unique keys into slot numbers.

The query module 119 stores mappings that indicate which node 410 of the database 115 stores each slot. Based on the mappings, the query module 119 generates parallel queries to each of the indicated nodes 410 for the cell data. Each of the parallel queries has a predictable response time, and by extension the entire parallel query has a predictable response time, due to the monitoring for the overflow by the query module 119 condition described above. Each parallel query returns the geolocated data for the shard stored by the corresponding node 410. The query module 119 aggregates (e.g., concatenates) the results from each query and provides them to the requesting client 120.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken, and information sent, to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Except where otherwise stated, databases and applications may be implemented on a single system or distributed across multiple systems. Similarly, distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Method

Figure 5:
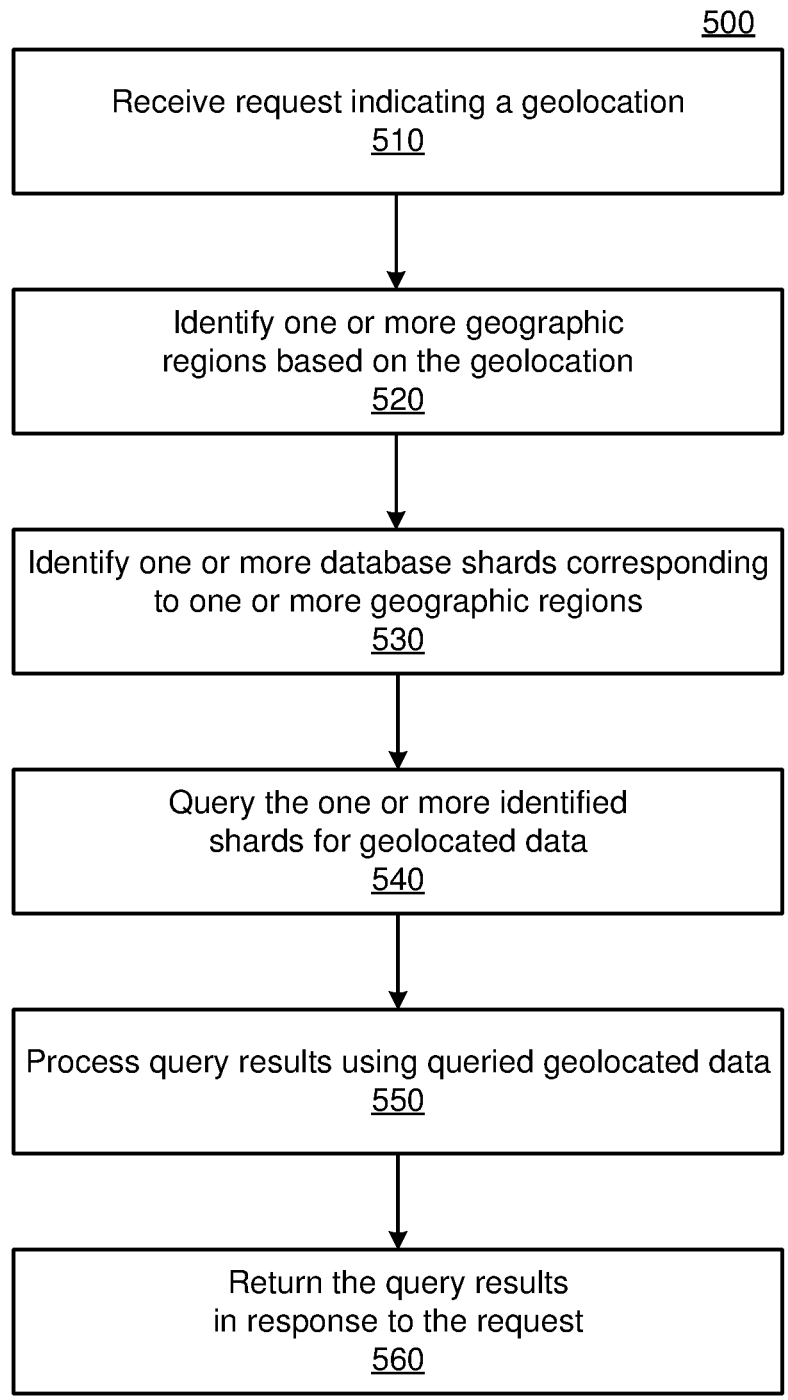
FIG. 5 is a flowchart of a method of providing game data for arbitrary numbers of geolocated items with predictable query times, according to one embodiment.

FIG. 5 illustrates an example method 500 for providing geolocated data including an arbitrary number of items with predictable query response times. The steps of FIG. 5 are illustrated from the perspective of the query module 119 performing the method 500. However, some or all of the steps may be performed by other entities and/or components. In addition, some embodiments may perform the steps in parallel, perform the steps in different orders, or perform different steps.

In the embodiment shown in FIG. 5, the method 500 begins with the query module 119 receiving a request that indicates a geolocation (e.g., GPS coordinates of a client 120). As described previously, the request may describe various database queries, such as a request to retrieve, update, or otherwise modify geolocated data. The query module 119 identifies 520 one or more geographic regions based on the geolocation. For example, as described previously, the geographic regions may be S2 cells of a specified level within a predetermined distance from the location.

The query module 119 identifies 530 one or more database shards of a database, where the one or more database shards each correspond to a respective geographic region of the one or more geographic regions. As described previously, the shards may be identified using a deterministic hashing technique. The query module 119 queries 540 the identified shards for geolocated data corresponding to the one or more geographic regions, where the query 540 has a predictable query response time. As described above, if the identified database shards includes multiple database shards, the query module 119 may query the multiple shards in parallel. The query module 119 processes 550 the query results using the queried geolocated data and returns 560 the query results as a response to the received request. For example, if the query module 119 queries multiple shards in parallel, the query module 119 may aggregate query results from each of the parallel queries (e.g., geolocated data retrieved from each of the respective shards) into an overall query result and provide the overall query result as the response to the received request.

Example Computing System

Figure 6:
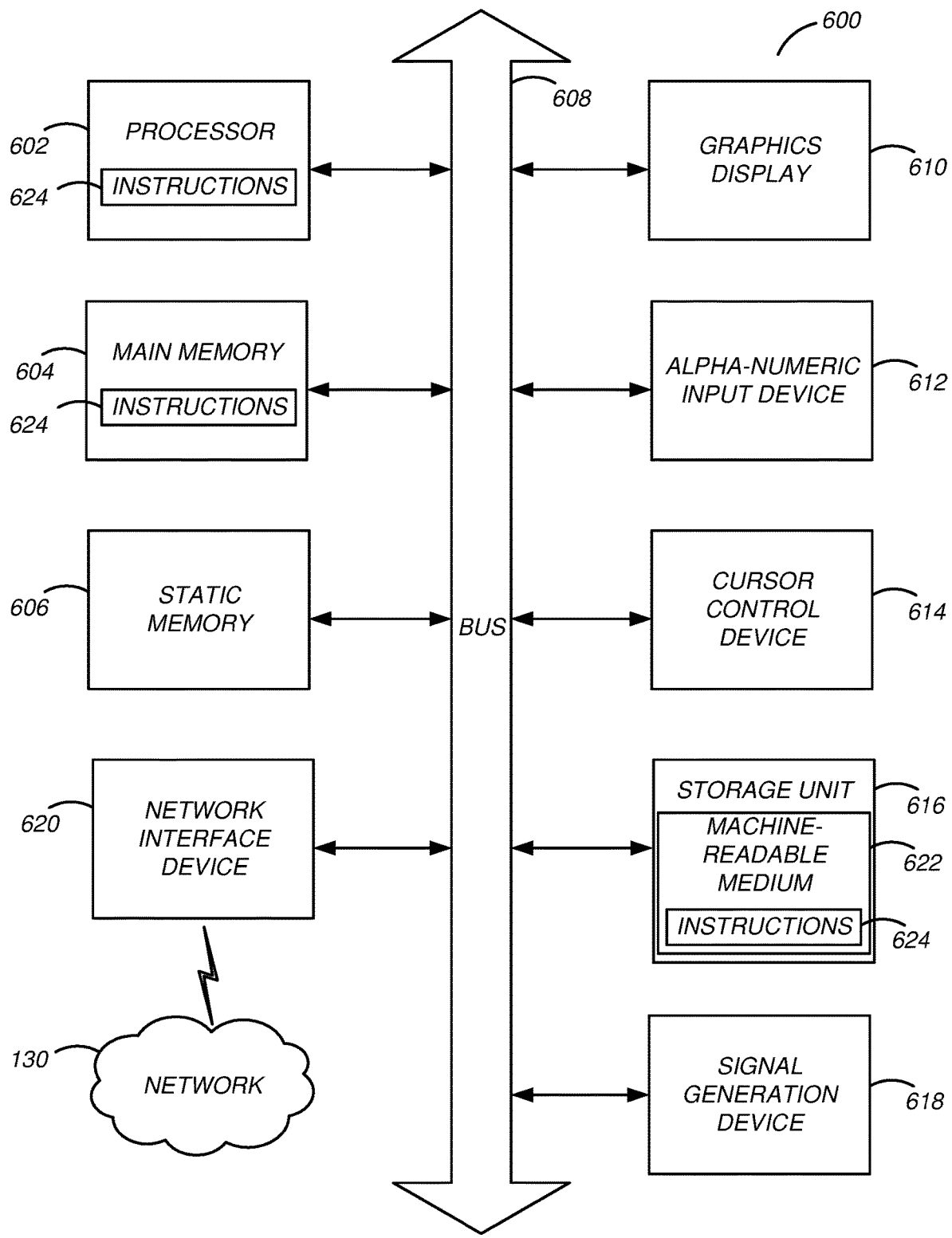
FIG. 6 is a block diagram illustrating an example computer suitable for use in the networked computing environment of FIG. 1, according to one embodiment.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any of the methodologies (or processes) described herein. The machine may operate as a standalone device or provide the described functionality in conjunction with other connected (e.g., networked) devices. The machine may operate in the capacity of a server or a client in a server-client network environment, or as a peer machine in a peer-to-peer (or distributed) network environment.

The machine may be a server computer, a client computer, a personal computer (PC), a tablet PC, a smartphone, a network router, or any other machine capable of executing instructions 1024 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally one or more processors 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 602 may refer to a single processor or multiple processors. The computer system 600 also includes a main memory 604. The computer system may include a storage unit 616. The processor 602, memory 604, and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, a touchscreen, or other pointing instrument), a signal generation device 618 (e.g., a speaker), and a network interface device 620, which also are configured to communicate via the bus 608. The computer system 600 may also include other input devices/sensors, such as a microphone, camera, barometer, gyroscope, accelerometer, etc.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 130 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for retrieving geolocated data based on a geolocation, the method comprising:
receiving a request from a client device for the geolocated data based on the geolocation, the geolocation corresponding to a geographic position of the client device;
identifying a geographic region based on the geolocation;
identifying a plurality of database shards from a set of database shards storing geolocated data for geographic regions, each of the identified plurality of database shards including geolocated data corresponding to the geographic region;
querying the identified plurality of database shards in parallel, each parallel query querying a database shard for geolocated data corresponding to the geographic region, wherein each parallel query querying a database shard has a predictable response time that does not exceed a threshold;
and
returning query results in response to the request.

2. The method of claim 1, further comprising:
evaluating geolocated data stored within a database shard of the plurality of database shards according to an overflow condition, the overflow condition indicative of a response time for a query of the database shard being undesirable;
determining, based on the evaluation, that the geolocated data stored within the database shard meets the overflow condition;
responsive to determining the overflow condition is met, adding a new database shard to the plurality of database shards corresponding to the geographic region; and
responsive to receiving additional geolocated data associated with the geographic region for storage, storing the additional geolocated data in the new database shard.

3. The method of claim 2, wherein the overflow condition comprises one or more of a threshold memory size of geolocated data stored within the database shard, a threshold number of database records stored within the database shard, or a threshold query response time for queries of the database shard.

4. The method of claim 2, further comprising:
responsive to determining that the geolocated data meets the overflow condition, setting a flag associated with the database shard indicating a number of database shards corresponding to the geographic region has increased.

5. The method of claim 1, wherein the request includes a cell level indicating a size of the geographic region, and wherein identifying the geographic region comprises:
querying a geographic cell index using the geolocation and the cell level for a geographic cell corresponding to the geographic region.

6. The method of claim 5, wherein the geographic cell is associated with a cell identifier and a number of database shards, and wherein querying the identified plurality of database shards in parallel comprises:

for each of the identified plurality of database shards:
determining a unique key for the database shard based on the cell identifier for the geographic cell and the number of database shards associated with the geographic cell;
determining a database node storing the database shard corresponding to the unique key; and
querying the database node for geolocated data included in the database shard corresponding to the unique key.

7. The method of claim 6, wherein determining the database node storing the database shard corresponding to the unique key comprises:

generating a slot number by applying the unique key and a maximum number of slots of the database node to a hash function; and
comparing the slot number to a database mapping indicating that a database slot associated with the slot number is stored on the database node.

8. The method of claim 1, wherein the geolocated data includes one or more virtual elements associated with locations within the geographic region.

9. The method of claim 8, wherein the one or more virtual elements are associated with a virtual world of a parallel-reality game application on the client device.

10. The method of claim 9, wherein the one or more virtual elements are associated with locations within a threshold distance of the geographic position of the client device.

11. A non-transitory computer-readable storage medium comprising instructions that, when executed by a computer processor, cause the processor to perform operations comprising:

receiving a request from a client device for geolocated data based on a geolocation, the geolocation corresponding to a geographic position of the client device;
identifying a geographic region based on the geolocation;
identifying a plurality of database shards from a set of database shards storing geolocated data for geographic regions, each of the identified plurality of database shards including geolocated data corresponding to the geographic region;
querying the identified plurality of database shards in parallel, each parallel query querying a database shard for geolocated data corresponding to the geographic region, wherein each parallel query querying a database shard has a predictable response time that does not exceed a threshold; and
returning query results in response to the request.

12. The computer-readable storage medium of claim 11, wherein the instructions further cause the processor to perform operations comprising:

evaluating geolocated data stored within a database shard of the plurality of database shards according to an overflow condition, the overflow condition indicative of a response time for a query of the database shard being undesirable;
determining, based on the evaluation, that the geolocated data stored within the database shard meets the overflow condition;
responsive to determining the overflow condition is met, adding a new database shard to the plurality of database shards corresponding to the geographic region; and
responsive to receiving additional geolocated data associated with the geographic region for storage, storing the additional geolocated data in the new database shard.

13. The computer-readable storage medium of claim 12, wherein the overflow condition comprises one or more of a threshold memory size of geolocated data stored within the database shard, a threshold number of database records stored within the database shard, or a threshold query response time for queries of the database shard.

14. The computer-readable storage medium of claim 12, wherein the instructions further cause the processor to perform operations comprising:

responsive to determining that the geolocated data meets the overflow condition, setting a flag associated with the database shard indicating a number of database shards corresponding to the geographic region has increased.

15. The computer-readable storage medium of claim 11, wherein the request includes a cell level indicating a size of the geographic region, and wherein identifying the geographic region comprises:

querying a geographic cell index using the geolocation and the cell level for a geographic cell corresponding to the geographic region.

16. The computer-readable storage medium of claim 15, wherein the geographic cell is associated with a cell identifier and a number of database shards, and wherein querying the identified plurality of database shards in parallel comprises:

for each of the identified plurality of database shards:
determining a unique key for the database shard based on the cell identifier for the geographic cell and the number of database shards associated with the geographic cell;
determining a database node storing the database shard corresponding to the unique key; and
querying the database node for geolocated data included in the database shard corresponding to the unique key.

17. The computer-readable storage medium of claim 16, wherein determining the database node storing the database shard corresponding to the unique key comprises:

generating a slot number by applying the unique key and a maximum number of slots of the database node to a hash function; and
comparing the slot number to a database mapping indicating that a database slot associated with the slot number is stored on the database node.

18. The computer-readable storage medium of claim 11, wherein the geolocated data includes one or more virtual elements associated with locations within the geographic region.

19. The computer-readable storage medium of claim 18, wherein the one or more virtual elements are associated with a virtual world of a parallel-reality game application on the client device.

* * * * *